(12) United States Patent
Bernhardt (10) Patent No.: US 10,820,598 B2
(45) Date of Patent: Nov. 3, 2020

(54) METHOD FOR MECHANICAL PRETZEL PRODUCTION

(71) Applicant: FRITSCH BAKERY TECHNOLOGIES GMBH & CO. KG, Markt Einerscheim (DE)

(72) Inventor: Udo Bernhardt, Iphofen (DE)

(73) Assignee: FRITSCH BAKERY TECHNOLOGIES GMBH & CO. KG, Markt Einersheim (DE)

(*) Notice: Subject to any disclaimer, the term of this patent is extended or adjusted under 35 U.S.C. 154(b) by 16 days.

(21) Appl. No.: 16/071,059

(22) PCT Filed: Jan. 20, 2017

(86) PCT No.: PCT/EP2017/051187
§ 371 (c)(1),
(2) Date: Jul. 18, 2018

(87) PCT Pub. No.: WO2017/125549
PCT Pub. Date: Jul. 27, 2017

(65) Prior Publication Data
US 2019/0037857 A1 Feb. 7, 2019

(30) Foreign Application Priority Data
Jan. 22, 2016 (DE) .................. 10 2016 101 139

(51) Int. Cl.
*A21C 3/08* (2006.01)
*A21C 11/00* (2006.01)

(52) U.S. Cl.
CPC .............. *A21C 3/08* (2013.01); *A21C 11/002* (2013.01)

(58) Field of Classification Search
CPC ........................................................ A21C 3/08
(Continued)

(56) References Cited

U.S. PATENT DOCUMENTS 2,114,951 A * 4/1938 Young ................ A21C 3/08
425/182
2,161,267 A * 6/1939 Young ................ A21C 3/08
425/168
(Continued)

FOREIGN PATENT DOCUMENTS

CH       444790 A  * 10/1967  ............... A21C 3/08
DE     1782289 C3    7/1976
(Continued)

*Primary Examiner* — Timothy Kennedy
(74) *Attorney, Agent, or Firm* — Brooks Kushman P.C.

(57) ABSTRACT

The invention relates to a method for machine production of pretzels, comprising:
  providing a pretzel shaping and looping device, which receives strands of dough by means of a feed mechanism;
  gripping the central area of the strands of dough with a shaping unit of the device, wherein the central area of the strand of dough is wrapped around a plurality of bolt-type shaping elements of the shaping unit that are adjustable in height;
  gripping the ends of the dough using grippers and stretching the strand of dough (8) by pulling on the ends of the strand of dough, while securing the central area of the strand of dough by the shaping unit, and
  shaping a pretzel knot using a mutual rotation of the grippers, wherein the shaping of the pretzel knot is initiated by rotation of the grippers during the stretching of the strand of dough.

17 Claims, 5 Drawing Sheets

(58) Field of Classification Search
USPC .......................................................... 425/323
See application file for complete search history.

(56) References Cited

U.S. PATENT DOCUMENTS

| | | | | |
|---|---|---|---|---|
| 5,580,599 A * | 12/1996 | Fehr | .......................... | A21C 3/08 198/418.6 |
| 6,036,990 A * | 3/2000 | Shlyakhovsky | ......... | A21C 3/08 425/319 |
| 2007/0048423 A1* | 3/2007 | Bernhardt | ................ | A21C 3/08 426/499 |
| 2010/0159098 A1* | 6/2010 | Bernhardt | ................ | A21C 3/08 426/499 |
| 2012/0219656 A1* | 8/2012 | Bernhardt | ................ | A21C 3/08 425/323 |
| 2013/0059051 A1* | 3/2013 | Bernhardt | ................ | A21C 9/088 426/499 |
| 2013/0216672 A1* | 8/2013 | Bernhardt | ................ | A21C 3/08 426/499 |

FOREIGN PATENT DOCUMENTS

| | | | | |
|---|---|---|---|---|
| DE | 4105254 C1 | * | 5/1992 | ............... A21C 3/08 |
| DE | 102006026558 a1 | * | 12/2007 | ............... A21C 3/08 |
| DE | 102013103368 A1 | | 10/2014 | |
| WO | 2006/089928 A1 | | 8/2006 | |

\* cited by examiner

METHOD FOR MECHANICAL PRETZEL PRODUCTION

This application is a United States national stage entry of International Application serial no. PCT/EP2017/051187 filed Jan. 20, 2017 which claims priority to German Application No. 10 2016 101 139.8, filed Jan. 22, 2016. Each of these applications is incorporated herein by reference in its entirety.

The invention relates to a method for machine production of pretzels, having the features of the preamble of process claim 1, and a device for carrying out the method.

In a known method (DE 100 29 171), the following method steps are provided:

First, a pretzel shaping and looping device is provided, which receives strands of dough by means of a feed mechanism in the form of a conveyor belt. The strands of dough are preshaped in advance, and the ends are aligned symmetrically and sent to the shaping and looping device on a conveyor belt system.

Then the central area of a strand of dough that is supplied is gripped by the shaping unit of the apparatus, wherein the central area of the strand of dough is wrapped in a U-shaped wrap about a plurality of bolt-type elements of the shaping unit that are adjustable in height. In the prior art, the bolt-type shaping elements of the shaping unit that are adjustable in height are lifted through interspaces between conveyor belt sections running in parallel.

Then the ends of the strands of dough, all of which point essentially in one direction, are gripped by grippers of a gripping unit, and the strand of dough is stretched by the shaping unit by applying traction to the ends of the strand of dough, while at the same time securing the central area of the respective strand of dough.

After being stretched, a mutual rotation of the gripping elements is initiated, thereby shaping the pretzel knots.

The known method is not optimized, inasmuch as the stretching process and the looping process for shaping the knot take place in chronological order, which delays the process.

In addition, the looping process in the prior art is not started until the ends of the strands of dough have already been returned back in the direction of the center point. In doing so, the ends of the strand of dough are lifted to a relatively great extent with respect to the central area of the strand of dough, so there is the risk that the central area of the strand of dough might slide over the upper ends of the bolt-type shaping elements of the shaping unit. In the prior art, the hold-down guides must therefore be provided for the strand of dough, gripping the strand of dough-like tongs between the central area of the strand and the area forming the knot, thereby preventing the central area of the strand of dough from being pulled upward by the shaping elements in the looping process.

The object of the present invention is to design a method having the features of the preamble of claim 1, so that the method can be carried out with a technically reduced machine complexity as well as a higher number of cycles. This object is achieved by the fact that the shaping of the pretzel knots is initiated by mutual rotation of the gripper elements already during the stretching or phase of stretching the strand of dough.

The shaping of the pretzel knot during the process of stretching the strand of dough has a positive effect on the manufacturing process in several regards. First, the shaping of the pretzel knot during the stretching process results in the central area of the strand of dough being wrapped especially tightly around the bolt-type shaping elements, so that it is usually possible to prevent the dough from sliding upward. A first rotation, for example, 180° rotation of the gripper, results in closing of the eye of the pretzel strand as it is shaped, and the surface of the strand of dough comes in particularly intimate contact with the bolt-type protrusions. Stretching of the strand of dough by pulling on the ends of the dough, while at the same time partially shaping the knot up to a relative reversal point of the gripper pair with respect to the central area of the strand of dough takes place in such a way that the point of intersection of the strands of dough is not lifted or is lifted only insignificantly higher than the protruding height of the shaping elements above a dough supporting surface, for example, a conveyor belt. In the additional following looping process to produce the pretzel knot to be produced by the gripping device, care is taken to ensure that the strand of dough does not slip upward due to the friction-locking effect or partial form-fitting effect between the surface of the strand of dough and the shaping element. Therefore, gripper-like or tong-like hold-down devices need not be used, which further accelerates the process and simplifies the production equipment.

If the ends of the strands of dough that are already under tension are crossed when the shaping of the pretzel knot is initiated, so that the point of intersection of the ends of the pieces of dough is no higher than the projecting height of the shaping elements above the dough supporting surface or is only insignificantly higher, i.e., typically in a range between 0.5 mm and 10 mm, it is expediently provided that the central area of the strand of dough does not extend beyond the projecting height of the shaping elements above the dough supporting surface. It is thus possible to secure the strand of dough, or the central area of the strand of dough, in such a way as to prevent the risk of uncontrolled movement of the strand of dough during the shaping of the pretzel knot.

The ends of the strand of dough are lifted with respect to the dough supporting surface, both during the phase of stretching the strand of dough, i.e., a relative movement of the grippers away from the midpoint of the strand of dough as far as a reversing point and also subsequently during a dough relaxation phase. This lifting need not necessarily be carried out continuously. It may also take place in increments, at any rate both the dough stretching process and the dough release process being associated with the lifting of the ends of the strand of dough by the grippers in contrast with the prior art, where the ends of the strand of dough are primarily lifted only during the stretching phase without initiating a looping process or rotation of the grippers.

With regard to the movement of the grippers, it may be advantageous if the joint axis of rotation of the two grippers holding the ends of the strand of dough executes a tumbling movement in the rotation process, i.e., the rotation of the grippers while gripping the strands of dough is limited to only a short rotational portion, so that the rotational process can take place at a relatively low and shallow level above the conveyor system. The intersecting or already crossed ends of the strands of dough must of course be returned back over the central area of the partially shaped pretzel in order to meet in the center area. To do so, they must be lifted above the upper ends of the bolt-type shaping elements of the shaping unit. To do so, it is advantageous if the shaping elements are lowered at least partially, individually or in groups, and/or if they are pulled beneath the plane of the dough supporting surface. Retraction of the bolt-type shaping elements is controlled by the process during the transfer of the ends of the strand of dough to the central area.

Due to the relatively early onset of rotation of the grippers according to the invention, the pretzel knot can be created completely, either during the dough stretching phase or during the dough relaxation phase, so the pretzel knot is very tightly connected, which is further supported by the alternating pulling effect of the rotating grippers. One gripper initially stretches the strand of dough at one end, while the other gripper releases the other end of the dough at least slightly, so that the previously released end is then stretched again and the first end is released somewhat, resulting in a particularly intimate joining of the two strands of dough forming the pretzel knot.

To reliably prevent the strand of dough from slipping over the upper ends of the shaping elements, in particular at very high cycle numbers of the apparatus, it may be advantageous if the shaping elements are at least partially curved. Therefore, a form-fitting connection is created on the shaping elements, holding the strands of dough "on the bottom" in the area of the shaping unit. The form-fitting connection can be canceled by the fact that the bolt-type shaping elements are either pulled downward on a curved path, thereby releasing the strand of dough, or they rotate approx. 180° about a vertical axis, so that the hook-type grip of the bolt-type elements around the strand of dough is also released.

To release the strand of dough from the undercut, shaping elements having a protrusion are typically rotated at least partially about their vertical axis, i.e., over a certain angular range that is sufficient to release the strand of dough from the undercut. Curved shaping elements, i.e., in particular shaping elements with a shell-type curvature, are typically moved or retracted along a path of movement defined by the curved shaping elements into a position to release the strand of dough from the undercut, i.e., in particular those curved in the shape of a sickle.

The gripping unit, provided with grippers, is moved in at least two different degrees of freedom of movement relative to the bolt-type shaping elements in the phase of stretching the strand of dough, wherein a first degree of freedom of movement is a linear movement along the gripping unit of a linear axis of movement relative to the bolt-type shaping elements and at least one additional degree of freedom of movement is a rotational movement (rotary movement) of the gripping unit about an axis of rotation relative to the bolt-type shaping elements. Another degree of freedom of movement may be the lifting movement of the gripping unit. The movement of the grippers is typically a movement of the gripping unit which is combined with and/or superimposed from movements in a plurality of different degrees of freedom of movement (movement relative to the shaping elements). The ends of the strand of dough may be lifted either on an oblique path running in a straight line or on a path that is curved either upward or downward or in increments. The lifting preferably takes place at a comparatively shallow angle relative to the dough supporting surface and in particular slightly above the projecting height of the shaping elements, above the dough supporting surface. In a relaxation, which follows the phase of stretching of the dough, there may be additional lifting of the grippers.

The bolt-type shaping elements may be adjustable in height in at least two directions. The height adjustment of the shaping elements may be done in a variable manner as a function of the geometric dimensions, in particular the diameter, in particular of the central area of the strand of dough. The adjustment may take place in such a way that the free end of a respective shaping element protrudes at least beyond the crown point of the round or roundish strand of dough, in particular when seen in cross section, optionally the entire strand of dough. This ensures secure contact of the respective strand of dough with the shaping elements, in particular also for strands of dough having different dimensions. Detection of the geometric dimensions, in particular the diameter, in particular of the central area of a strand of dough may take place by means of a suitable detection device, i.e., for example, an optical detection device, in particular a camera.

The invention will now be explained in greater detail on the basis of advantageous embodiments in the drawings in the figures, wherein both the features of the process in the drawings as well as features of the apparatus for carrying out the process are explained.

Figure 1:
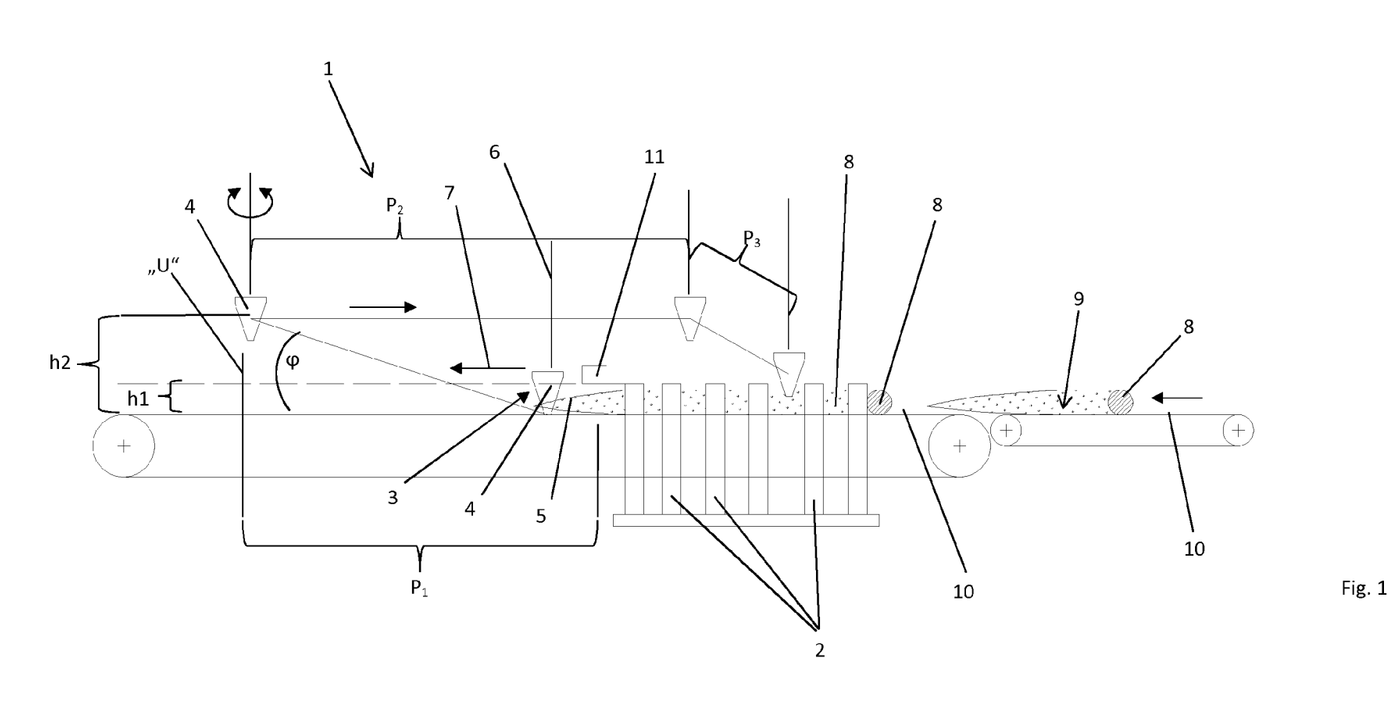
FIG. 1 shows a schematic diagram of the process steps that take place in the prior art.

First, according to FIG. 1 the state-of-the-art method is described.

This method presupposes a pretzel shaping and looping apparatus 1, comprising, among other things, an arrangement of bolt-type shaping elements 2 and a gripping unit 3, wherein the gripping unit 3 has two grippers 4 for gripping the ends 5 of the strand of dough. The two grippers 4 can be rotated about a common axis of rotation 6 and can be moved in the conveyance direction 7 on the whole, relative to the bolt-type shaping elements 2 in order to exert a tension on the ends 5 of the strand of dough resulting in stretching of the strand of dough 8. At the right of the shaping unit formed by the bolt-type shaping elements 2, FIG. 1 also shows a strand of dough 8, wherein the strand of dough is fed to the apparatus 1 on a feed system 9 in the form of a conveyor belt 10.

In the prior art, the strands of dough are stretched to a reversal point U during a stretching phase P1 without a looping process, and at the same time they are lifted to a height h2. Then a stretching-relaxation phase P2 is initiated, during which the distance between the grippers, previously having been moved to the reversal point U, is reduced relative to the shaping elements 2. The relative distance here is at issue, wherein both the gripping unit 3 and the shaping unit formed by the bolt-type shaping elements 2 can be moved.

Thus, in the prior art, only the ends 5 of the strand of dough are lifted during the stretching phase P1 until reaching the height h2 at the reversal point. Then, during a relaxation and looping phase, the gripping unit 3 is retracted in the direction of the shaping unit, and the looping process is carried out, then the ends 5 of the strand of dough are lowered onto the central area of the portion of dough and pressed in there during phase P3.

During the looping phase and the stretching-relaxation phase P2, the height h2 is essentially retained. The height h2 is of such a dimension that the pair of grippers can lift the ends 5 of the strand of dough with no problem above the upper ends of the lifted bolt-type shaping elements 2 without the continuous strand of dough 8 sticking to the shaping elements 2.

Since the lifting of the ends 5 of the strand of dough during the stretching phase P1 also takes place at a relatively steep angle, it may be feared that the strand of dough 8 will slip upward from the bolt-type shaping elements 2, which would result in termination of the looping process. For this reason, at the start of the stretching phase P1 of the strand of dough, a hold-down apparatus 11 in the manner of a gripping unit is placed around the two ends of the strands of dough being combined and/or optionally also moved with the gripping unit 3. This holds down the stretching strand of dough 8 in the area of the shaping and looping apparatus 1 so far below the conveyor belt system that the strand of dough 8 is reliably prevented from slipping over the top edge of the bolt-type shaping elements 2. Due to this hold-down unit 11, the number of cycles of the apparatus is reduced and the machine complexity is reduced.

References made to FIG. 2 in the following discussion.

Figure 2:
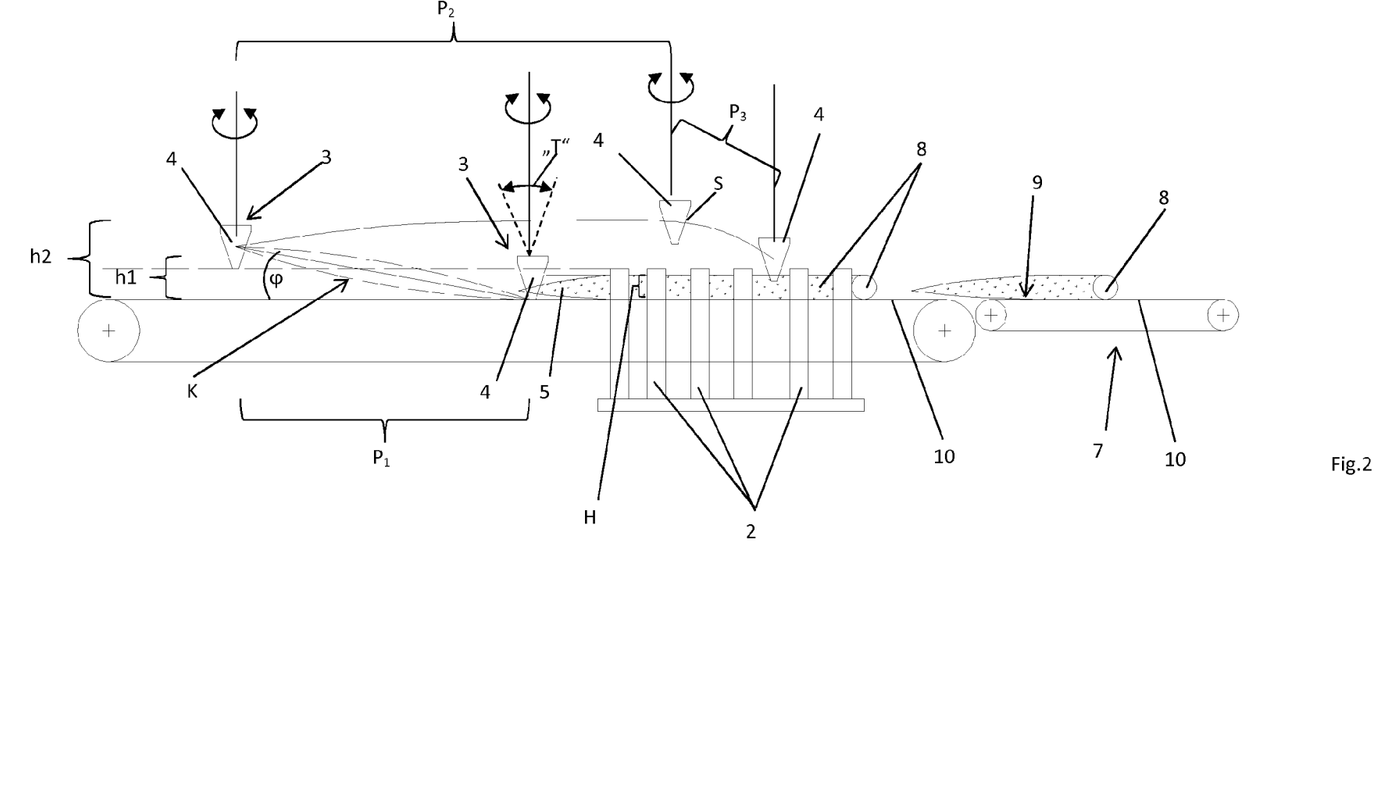
FIG. 2 shows a diagram of the process steps according to the invention, as in FIG. 1, wherein the ends of the strands of dough and the following rotation of the grippers are indicated for initiation of the process of looping the pretzel knot.

Identical elements or phases in FIG. 2 are labeled with the same reference numerals as those used in FIG. 1.

It can first be seen that, during the stretching phase P1 of the strand of dough, the ends 5 of the strand of dough are lifted up from the conveyor belt system by the grippers 4 of the gripping unit 3 at a much smaller angle φ than in the prior art. At the reversal point U, a height of only h1 is reached, which is definitely below the final lifted height h2, which is sufficient to lift the crossed ends 5 of the strand of dough above the upper ends of the bolt-type shaping elements 2 of the shaping unit, which are adjustable in height. Lifting of the ends 5 of the strand of dough during the first phase P1 may take place either on a straight path or on a path that is curved either up or down, or it may take place incrementally, but at any rate at a shallower angle on the whole and only up to a minor height h1 because further lifting of the grippers takes place after the reversal point U, i.e., in the relaxation phase P2. On the whole, the lifting is thus distributed between two phases, which makes the overall process smoother. Furthermore, it can be seen that the gripping unit 3 with the grippers 4 already begins to rotate in the dough-stretching phase P1 to cross the ends 5 of the strand of dough at least partially. During the relaxation phase P2, even with further lifting of the ends 5 of the strand of dough, the gripping unit 3 will also rotate further to carry out a final completion of the pretzel knot.

It is within the scope of the invention that the gripping unit 3 still rotates even during a lowering phase P3, but it may also be that the pretzel knot is already completely shaped at the end of the relaxation phase P2, i.e., at the crown point S of the upper movement curve.

When initiating the shaping of the pretzel knot, the dough ends 5 that are already being pulled are crossed in such a way that the point of intersection K is no higher or is only insignificantly higher than the projecting height H of the shaping elements 2 above the dough supporting surface in the form of the conveyor belt 10.

In the subsequent additional looping process for producing the pretzel knot, the strand of dough 8 is held by the gripping device 3 in the area of the projecting height H of the bolt-type shaping elements 2 by a friction-locking or partially form-fitting connection between the surface of the strand of dough 8 and the shaping elements 2. The plurality of bolt-type shaping elements 2 is wrapped by the strand of dough 8 in a wrap range of at least 220°, which is shown best in the view from above according to FIG. 5. It is assumed here that a complete wrap takes up a wrap range of 360° and that a U-shaped half-wrap takes up a wrap range of 180°. A wrap range of at least 220° is advantageous.

To minimize the distance between the gripping elements 4 and the dough supporting surface, namely the conveyor belt 10, it may be advantageous if the joint axis of rotation of the grippers 4 in the looping process executes a tumbling motion "T" as indicated in phase P1 in FIG. 2.

In addition, it is advantageous if the shaping elements 2 are retracted individually or in groups at least partially below the plane of the dough support. This facilitates the process of lifting the strand of dough 8 into the central area of the eye of the strand of dough 8. The bolt-type shaping elements 2 can be retracted as a process-controlled operation, while the ends 5 of the strand of dough are transferred to the central area of the shaping unit.

Figure 3:
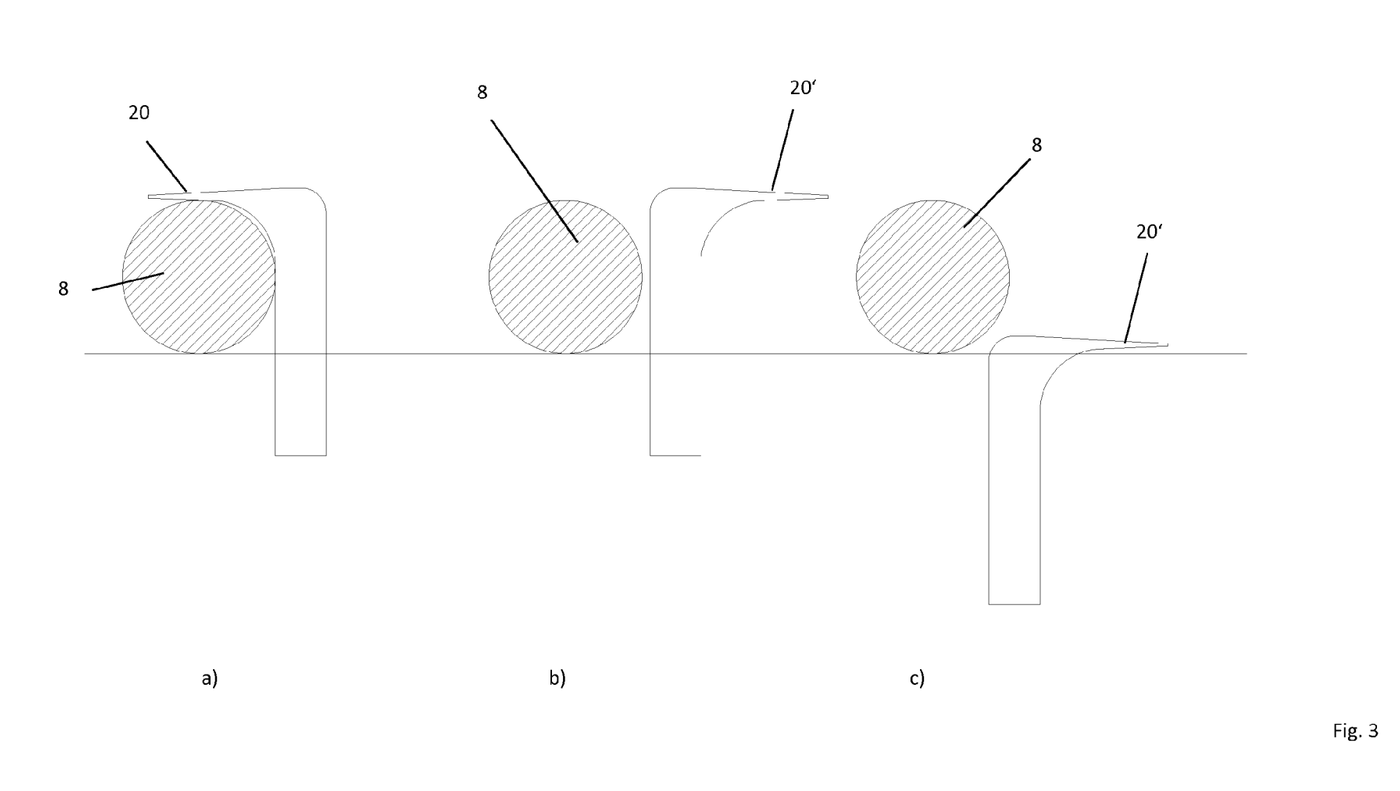
FIG. 3 shows a schematic detailed diagram of the bolt-type shaping elements with the protrusions that grip the strand of dough.
Figure 4:
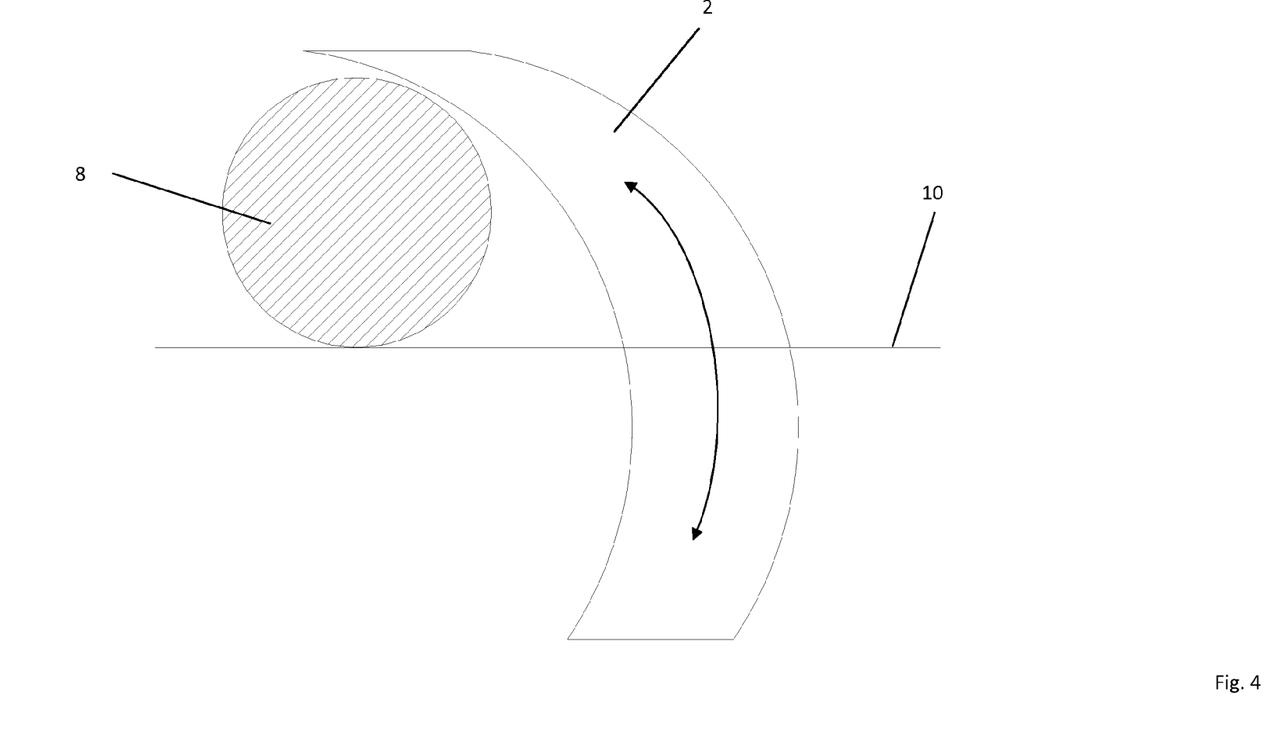
FIG. 4 shows a schematic diagram of shaping elements with an overall curvature.

FIGS. 3 and 4 illustrate different possibilities for ensuring that the strand of dough 8 will be held down in the area of the shaping elements 2 in particular at high cycle counts. According to FIG. 3, the shaping elements 2 have hook-type projections 20 on their upper ends, so that when they are facing outward on the ring of the shaping elements 2 the projections extend over the strand of dough 8 wrapped around them, as indicated in FIG. 5.

Figure 5:
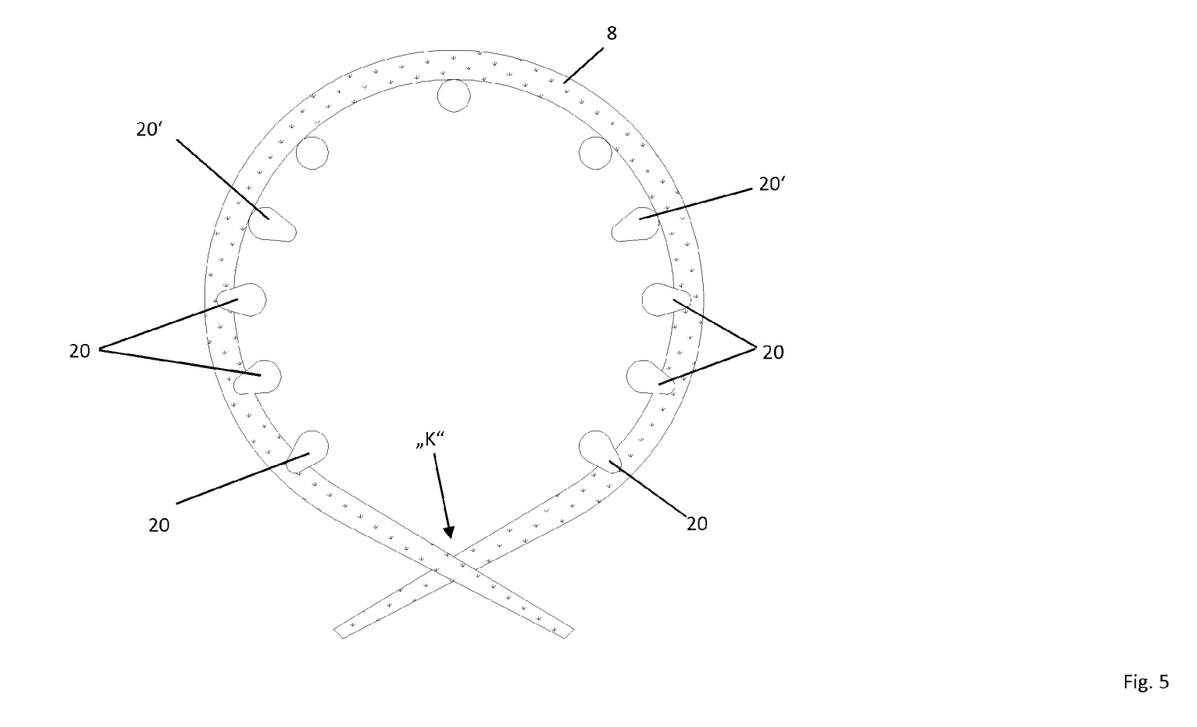
FIG. 5 shows a schematic top view of the ring of shaping elements after an initial rotation of the grippers.

The bolt-type shaping elements 2 are mounted, so they can rotate about their vertical axis to release the strand of dough 8 as soon as the hook-type protrusions 20 have rotated inward and thus reached position 20' in FIG. 5, so that the wrapped strand of dough 8 is released. In addition, the bolt-type shaping elements 2 can then be moved into a lowered position without damaging the strand of dough 8 as shown in FIG. 3c.

FIG. 4 illustrates a different type of form-fitting connection and the release of this form-fitting connection. The bolt-type shaping elements 2 are designed like curved teeth, which can be moved downward on a curved path on the whole, to thereby release the form-fitting connection over the strand of dough 8 being held.

LIST OF REFERENCE NUMERALS 1 pretzel shaping and looping device
2 shaping element
3 gripping unit
4 gripper
5 end of strand of dough
6 axis of rotation
7 conveyor direction
8 strand of dough
9 feed mechanism
10 conveyor belt
11 hold-down device
20 projections
20' position
P1 dough stretching phase
P2 dough relaxation phase
P3 lowering phase
H projection height
h1 height
h2 lifting height
K intersection point
U reversal point
T tumbling movement

The invention claimed is:

1. A method for machine production of pretzels, comprising:
gripping a central area of a strand of dough with a shaping unit of a pretzel shaping and looping device, which receives the strand of dough by means of a feed mechanism, wherein the central area of the strand of dough is wrapped around a plurality of shaping elements of the shaping unit that are adjustable in height;
gripping ends of the strand of dough by means of a gripping unit which is equipped with grippers and stretching the strand of dough by pulling on the ends of the strand of dough, while at the same time securing the central area of the strand of dough by the shaping unit; and
shaping a pretzel knot by means of a mutual rotation of the grippers; wherein
the shaping of the pretzel knot is initiated by rotation of the grippers already during the stretching of the strand of dough, wherein in initiation of the shaping of the pretzel knot, the ends of the strand of dough that are already under tension are crossed in such a way that a point of intersection of the ends of the strand of dough is no higher than or up to 10 mm higher than a projecting height of the shaping elements above a dough supporting surface.

2. The method according to claim 1, wherein the strand of dough is held by the grippers in an area of the projecting height of the shaping elements by means of a friction-locking connection and/or partial form-fitting connection between a surface of the strand of dough and the shaping elements in a subsequent additional looping process to produce the pretzel knot.

3. The method according to claim 1, wherein the plurality of shaping elements is wrapped by the strand of dough in a wrap range of at least 220°.

4. The method according to claim 1, wherein the ends of the strand of dough are lifted with respect to the dough supporting surface both during a dough stretching phase as well as during a dough relaxation phase.

5. The method according to claim 4, wherein during the dough-stretching phase, the ends of the strand of dough are lifted only far enough that the point of intersection is situated beneath the projecting height of the shaping elements above the dough supporting surface.

6. The method according to claim 1, wherein a joint axis of rotation of the grippers enables a tumbling movement in a wrapping process.

7. The method according to claim 1, wherein the shaping elements are at least partially lowered individually or in groups and/or are retracted below a level of the dough supporting surface.

8. The method according to claim 1, wherein creation of a form-fitting connection of at least one undercut which holds down the strand of dough in at least some sections, and does so at least in a crossing and/or in a looping process by means of a curved design of at least one of the shaping elements, wherein
the at least one undercut which holds down the strand of dough is created by a protrusion on the free end of the at least one shaping element.

9. The method according to claim 8, further comprising at least partial rotation of the at least one shaping element about its vertical axis to release the strand of dough from the undercut.

10. The method according to claim 1, wherein the shaping elements are each curved and retracted on a curved path.

11. The method according to claim 1, wherein the grippers are lifted during a stretching phase of the strand of dough, increasing distance of the grippers from the shaping device, as well as reducing the distance of the grippers from the shaping device during a dough relaxation phase, and the grippers are lowered only during a last phase of the dough relaxation phase to combine the ends of the strand of dough with the central area of the strand of dough.

12. The method according to claim 1, wherein the gripping unit is moved during a dough stretching phase in at least two different degrees of freedom of movement relative to the shaping elements, wherein a first degree of freedom of movement is a linear movement of the gripping unit along a linear axis of movement relative to the shaping elements, and at least one additional degree of freedom of movement is a rotational movement of the gripping unit about an axis of rotation relative to the shaping elements.

13. The method according to claim 1, wherein the shaping elements are adjustable in height in at least two directions, wherein the adjustment in height of the shaping elements is variable as a function of a geometric dimension of the strand of dough, such that a free end of a respective shaping element extends above at least a crown point of the strand of dough as seen in cross section.

14. A device for producing pretzels, the device comprising:
a pretzel shaping and looping device which receives a strand of dough via a feed mechanism, wherein the pretzel shaping and looping device has a shaping unit for gripping a central area of the strand of dough, the shaping unit including a plurality of shaping elements that are adjustable in height;
a gripping unit for gripping ends of the strand of dough, having a plurality of grippers, wherein a distance between the gripping unit and the shaping unit is variable for stretching the strand of dough when the ends of the strand of dough are gripped by the grippers and the central area of the strand of dough is gripped by the shaping unit; and
a control unit for controlling linear movement of either the gripping unit or the shaping unit for increasing and/or reducing the distance between the gripping unit and the shaping unit as well as for controlling rotation of the grippers carried out to execute looping movement for shaping the strand of dough to form a pretzel knot, wherein,
by means of the control unit, the rotation of the grippers can be controlled at the same time as a linear movement of either the shaping unit or the gripping unit for stretching the strand of dough, wherein
the control unit is configured to control a vertical adjustment device of the gripper unit so that upon initiation of the shaping of the pretzel knot, the ends of the strand of dough that are already under tension are crossed in such a way that a point of intersection of the ends of the strand of dough is no higher than or up to 10 mm higher than a projecting height of the shaping elements of the shaping unit above a dough supporting surface.

15. The device according to claim 14, wherein at least one of the shaping elements is curved for partial wrapping of the strand of dough around it in at least some sections.

16. The device according to claim 14, wherein the shaping elements each have a curved protrusion, and the protrusions are designed and supported so that they are at least partially rotatable to release the strand of dough when wrapped around them.

17. The method according to claim 13, wherein the adjustment in height of the shaping elements is variable as a function of diameter of the central area of the strand of dough.

\* \* \* \* \*